(12) United States Patent
True et al.

(10) Patent No.: US 7,387,133 B1
(45) Date of Patent: Jun. 17, 2008

(54) EXTENDABLE COVER FOR A GOLF CART

(75) Inventors: Dorian Thurston True, Augusta, GA (US); Marion Lee Jones, Augusta, GA (US); Nathan Carothers, Cornelius, NC (US)

(73) Assignee: Carolina Covertech, North Augusta, SC (US)

( * ) Notice: Subject to any disclaimer, the term of this patent is extended or adjusted under 35 U.S.C. 154(b) by 821 days.

(21) Appl. No.: 10/766,671

(22) Filed: Jan. 28, 2004

Related U.S. Application Data

(63) Continuation-in-part of application No. 10/080,270, filed on Feb. 21, 2002, now Pat. No. 6,805,396.

(60) Provisional application No. 60/443,110, filed on Jan. 28, 2003.

(51) Int. Cl.
*E04H 15/06* (2006.01)
(52) U.S. Cl. .................. 135/88.05; 135/88.07
(58) Field of Classification Search ............ 135/88.05, 135/88.01, 88.07, 88.08, 88.09
See application file for complete search history.

(56) References Cited

U.S. PATENT DOCUMENTS

| | | | |
|---|---|---|---|
| 179,392 A | 7/1876 | Ayers | |
| 194,061 A | 8/1877 | Thompson | |
| 208,564 A | 10/1878 | Bowers | |
| 621,615 A | 3/1899 | McConnell | |
| 1,360,407 A | 11/1920 | Hughes et al. | |
| 2,598,940 A | 6/1952 | Robie | |
| 3,152,707 A | 10/1964 | Rey | |
| 3,371,672 A | 3/1968 | Hale et al. | |
| 3,908,777 A | 9/1975 | Davidson | |
| 4,008,874 A | 2/1977 | Conway, Jr. | |
| 4,332,415 A | 6/1982 | Williams | |
| 4,469,114 A | 9/1984 | Kelley et al. | |
| 4,621,859 A | 11/1986 | Spicher | |
| 4,641,879 A | 2/1987 | Kassai | |
| 4,681,362 A | 7/1987 | Taylor | |

(Continued)

FOREIGN PATENT DOCUMENTS

DE 3517967 A1 11/1985

(Continued)

*Primary Examiner*—David R Dunn
*Assistant Examiner*—Noah Chandler Hawk
(74) *Attorney, Agent, or Firm*—Kilpatrick Stockton LLP

(57) ABSTRACT

The invention is an apparatus and method for extending a cover for a golf cart. The invention is preferably configured for attachment to a support frame of a golf cart, wherein the support frame supports a roof for the golf cart. The apparatus includes a stationary main frame member, brackets for mounting the stationary main frame member to the golf cart, a movable frame member, and a cover. The stationary main frame member is suitable for receipt by the brackets, which are in turn mounted to the upper portion of the support frame and possibly to the roof of the golf cart. The movable frame member is operatively secured to the stationary main frame member, and configured to pivotably rotate over a portion of the rear compartment of the golf cart. The cover is configured for attachment to the movable frame member so that when the movable frame member rotates over a portion of the rear compartment of the golf cart, the cover covers a portion of the rear compartment of the golf cart.

3 Claims, 5 Drawing Sheets

U.S. PATENT DOCUMENTS

| | | |
|---|---|---|
| 4,773,694 A | 9/1988 | Gerber |
| 4,830,037 A | 5/1989 | Held |
| 4,846,524 A | 7/1989 | Gerber |
| 6,216,714 B1 | 4/2001 | Tucker |
| 6,220,647 B1 | 4/2001 | Winkler |
| 6,227,217 B1 * | 5/2001 | Peta .................. 135/88.07 |
| 6,227,603 B1 | 5/2001 | Brock |
| 6,416,109 B1 | 7/2002 | Tyrer et al. |
| 6,471,281 B1 | 10/2002 | Tyrer et al. |
| 6,481,780 B2 | 11/2002 | Dolan et al. |
| 6,547,312 B2 | 4/2003 | Winkler |
| 6,601,904 B2 | 8/2003 | Winkler |
| 6,663,161 B1 | 12/2003 | Tyrer |
| 6,663,162 B1 | 12/2003 | Tyrer |
| 6,805,396 B2 | 10/2004 | True et al. |
| 2001/0039960 A1 * | 11/2001 | Shugar et al. .............. 136/244 |
| 2003/0183262 A1 * | 10/2003 | Tyrer .................. 135/88.09 |
| 2004/0026955 A1 | 2/2004 | Dolan et al. |
| 2004/0027373 A1 | 2/2004 | Jacquot et al. |

FOREIGN PATENT DOCUMENTS

| | | |
|---|---|---|
| JP | 11216215 | 10/1999 |

* cited by examiner

EXTENDABLE COVER FOR A GOLF CART

CROSS REFERENCE TO RELATED APPLICATIONS

This application is a continuation in part of U.S. Ser. No. 10/080,270, filed Feb. 21, 2002 now U.S. Pat. No. 6,805,396 and claims priority to U.S. Provisional Application No. 60/443,110 filed Jan. 28, 2003.

FIELD OF THE INVENTION

The invention relates generally to golfing accessories, and relates more particularly to a protective attachment for a golf cart.

BACKGROUND OF THE INVENTION

Golfing is a popular pastime for many people of all ages. Golfers occasionally use a motorized golf cart to transport their golf equipment while playing golf. Many golf carts include a rear compartment into which a golf bag and clubs can be positioned during the use of a cart. Commonly, the rear compartment is uncovered, even if the cart includes a top section for covering the seating compartment of the cart. Hence, the golf bag and clubs positioned in the rear compartment of the cart are unprotected from weather, elements, or precipitation, such as rainfall. A golfer's grip on his clubs, and his game, can be adversely affected if the grips of his clubs become wet. Thus, it is desirable to protect a golfer's bag and clubs from weather precipitation while the bag and clubs are positioned in the rear compartment of the golf cart.

At least one type of cover attaches to conventional golf carts and provides protection to a golf bag and clubs positioned in a rear compartment of the golf cart. However, a user's access to other accessories in the rear compartment of the golf cart can be hindered by the positioning of the cover with respect to the cart. Thus, there is a need in the art for a golf cart cover that does not interfere with a user's access to the rear compartment of the cart, yet provides a cover for the rear compartment.

Yet another type of cover attaches directly to the roof of a golf cart. Unfortunately, this type of cover tends to sway back and forth relative to the golf cart, and has relatively little structural support. The movement of the golf cart, combined with occasional or steady winds, causes this type of cover to vibrate and shake, causing unpleasant noise, vibration, or otherwise potentially damaging clubs or other accessories carried in the rear compartment of the golf cart. Therefore, there is a need in the art to provide an attachment to a golf cart that has improved structural support.

In addition, it is preferable that the cover be easily and conveniently retrofitted to any conventional golf cart, or any newly designed golf cart. There is a need in the art to be certain that a suitable cover attachment is provided for many various golf cart designs. Further, as new cart models are devised, it is preferable that the cover be readily adapted to such new models.

SUMMARY OF THE INVENTION

The present invention meets the above-described needs in the art. The invention provides a cover device and method that does not interfere with a user's access to the rear compartment of the cart, yet provides a complete cover for the cart's rear compartment. Furthermore, the invention also provides an attachment to a golf cart that has improved structural support. Finally, the invention attaches to the golf cart at the upper portion of the rear support frame and at the roof near the hand grip support handles, thus accommodating attachment to many golf cart designs or structures.

Generally described, the present invention is an apparatus for covering the rear portion of a golf cart. The apparatus is configured for attachment to a support frame of a golf cart, wherein the support frame supports a roof top for the golf cart. The apparatus includes a stationary main frame member, brackets for mounting the stationary main frame member to the golf cart, a movable frame member, and a cover. The stationary main frame member is suitable for receipt by the brackets, which are in turn mounted to the upper portion of the support frame and possibly to the roof of the golf cart. The movable frame member is operatively secured to the stationary main frame member, and configured to pivotably rotate over a portion of the rear compartment of the golf cart. The cover is configured for attachment to the movable frame member so that when the movable frame member rotates over a portion of the rear compartment of the golf cart, the cover covers a portion of the rear compartment of the golf cart.

More particularly described, the invention includes a stationary main frame connected to the golf cart by at least one bracket. The brackets preferably attach to the golf cart in two places—at the upper portion of the rear support frame and to the roof of the golf cart. The stationary main frame preferably defines a U-shape assembly with a pair of arm tubes and a connecting tube between the arm tubes. The stationary main frame tubes may be formed integrally or as separate pieces. The stationary frame connecting tube is attached to the golf cart by means of the brackets. The pair of stationary frame arms preferably extend downwardly of the connecting tube. A movable frame connects to the stationary main frame. The movable frame includes a U-shape piece with two arm bars. At least one arm of the movable frame connects to the stationary main frame. A connecting portion of the movable frame preferably connects the two arms so that the movable frame pivots away from the stationary main frame to support a cover. The stationary main frame may include a cover retainer strip. The cover retainer strip includes an elongate strip, and a channel recess extending along a portion of the elongate strip. The cover connects to the cover retainer strip. The cover extends from the channel recess and over the movable frame when the movable frame is rotated over a portion of the rear compartment of the golf cart.

In one aspect of the invention, the invention is a method for covering a rear compartment of a golf cart having a support frame to support a molded plastic top over the golf cart. The method includes mounting a stationary main frame member to brackets which are attached to the golf cart at two locations—one near the upper portion of the rear support members and the other on the roof near the hand grip support handles. Next, the method includes mounting a movable frame member to the stationary main frame member, the movable frame member configured to pivot toward the rear compartment of the golf cart. Finally, the method includes extending a flexible cover about the movable frame member so that when the movable frame member is moved, a portion of the flexible cover is extended from a first unopened position to a second covered position.

In yet another aspect of the invention, the invention includes a method for extending a cover from the upper portion of a golf cart. The method includes moving a movable frame member that is pivotably secured to a stationary main frame member. The movable frame depends from and pivots from a point that is below the uppermost portion of the movable frame. The movable frame defines a first unopened position and a second open position. In the unopened position, the movable frame is preferably collapsed. In the opened position, the movable frame is extended from the upper portion of the golf cart. Thus, the cover may be extended in any direction to protect either the golfer or the golfer's equipment or any part of the golf cart. The stationary main frame member is configured to mount to brackets which are attached to the golf cart at the upper rear portion of the rear support frame and the roof near the hand grip support handles, and the movable frame member is configured to cover a portion of the rear compartment of the golf cart.

DETAILED DESCRIPTION OF DISCLOSED EMBODIMENTS

The invention provides an extendable golf cart cover device and method. When used to cover the rear compartment of a conventional golf cart, the device does not interfere with a user's access to the rear compartment of the cart, yet provides a cover for the rear compartment. Furthermore, the invention provides an attachment to a golf cart that has improved structural support. Finally, the invention accommodates attachment of a golf cart cover to many different design models of golf carts.

Figure 1:
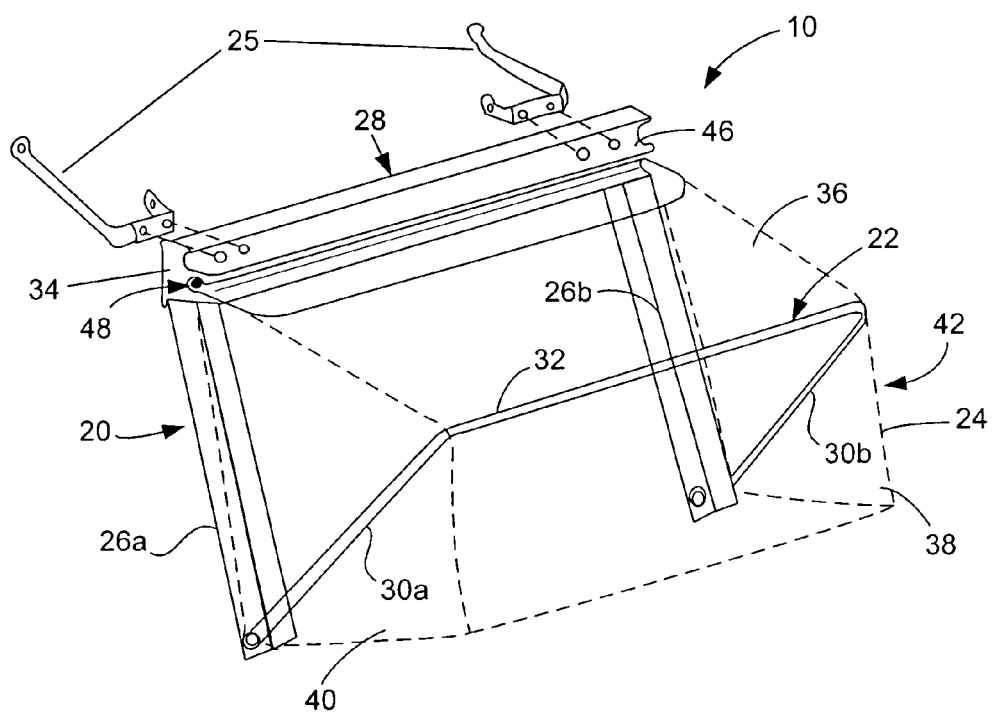
FIG. 1 is an exploded perspective view of a golf cart cover device in accordance with the present invention, including a preferred stationary main frame member, a preferred movable frame member, a preferred cover and preferred brackets.
Figure 2:
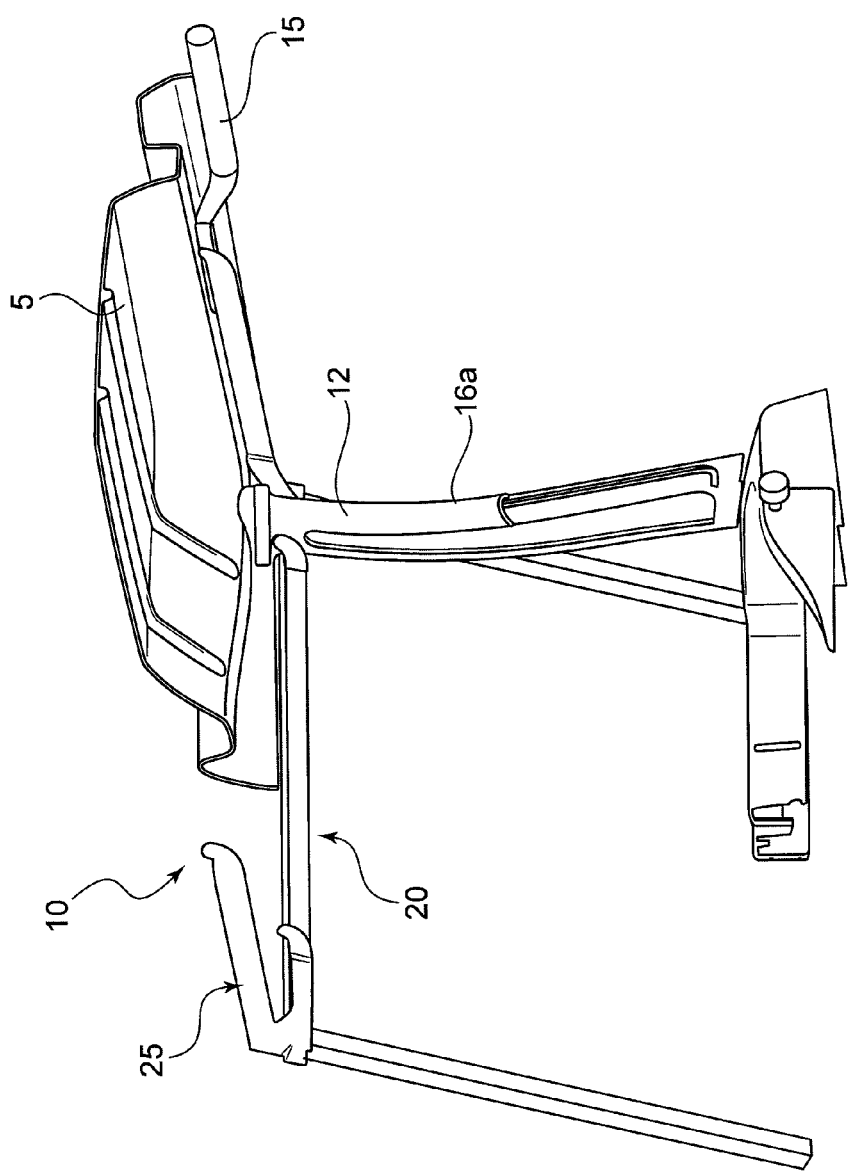
FIG. 2 is a side cut-away view showing an embodiment of the invention connected to the support frame and roof of a golf cart.

Turning now to the drawings in greater detail, where numerals represent detailed features of the invention, FIG. 1 illustrates an exploded perspective view of the stationary main frame 20 the movable frame 22 and a cover 24. FIG. 2 illustrates a cut-away view of a motorized golf cart molded plastic roof 5 and a perspective view of invention 10 that can be connected to an upper portion of a rear support frame member 12 and the roof 5 near the hand grip support handles 15.

The rear support frame 12 of the motorized golf cart includes two vertical arms 16a,b which aid in the support of the molded plastic roof 5. The invention 10 is a cover for the rear bag compartment of a motorized golf cart that includes a stationary main frame 20, a movable frame 22, and a cover 24. The stationary main frame 20 connects to the upper portion of a rear support frame 12 and the roof near the hand grip support handles 15 of the motorized golf cart by the use of two brackets 25. The cover 24 connects to the movable frame 22, and the movable frame 22 connects to the stationary main frame 20 so that both the movable frame 22 and cover 24 can pivot with respect to the stationary main frame 20 and the motorized golf cart.

A stationary main frame 20 can be a square-"U-shaped" frame made from approximately 1" square iron, aluminum or similar type of metal tubing. The stationary main frame 20 includes a pair of arm tubes 26a,b and a connecting tube 28 disposed between the arm tubes 26a,b. The connecting tube 28 is substantially straight along its length. Typically, the connecting tube 28 is oriented in a substantially horizontal position, and is substantially parallel with the top horizontal portions 18a,b of the rear support frame 12. When the connecting tube 28 is oriented in such fashion, the arm tubes 26a,b extend downward from each end of the connecting tube 28 so that the arm tubes 26a,b are oriented substantially parallel with, but not connected with, the vertical arms 16a,b of the rear support frame 12. The connecting tube 28 is then connected to the brackets 25 near the end of the brackets 25 where they attach to the upper portion of the rear support frame 12. Holes are machined through the brackets 25 at either end. Holes are machined through the upper horizontal portion of the rear support frame 12 and the roof 5 near the hand grip support handles 15 so that mounting bolts or hardware can secure the brackets to the golf cart. In addition to these holes for connecting the brackets to the golf cart, holes are also machined through the brackets 25 near the end where the bracket 25 connects to the upper portion of the rear support frame 12. Similar holes are machined through the connecting tube 28 so that mounting bolts or hardware can secure the connecting tube 28 to the brackets 25. When the connecting tube 28 is secured to the brackets 25, the stationary main frame 20 remains in a relatively fixed position with the respect to the rear support frame 12. In this manner, the stationary main frame 20 is connected to the brackets 25 which are connected only to the upper portion of the rear support frame 12 and the hand grip support handles 15. The stationary main frame 20 is not connected in any manner to the vertical arms 16a,b of the rear support frame 12.

The movable frame 22 includes two arm bars 30a,b and a connecting bar 32 disposed between each arm bar 30a,b. Each arm bar 30a,b is substantially straight along its length. The connecting bar 32 is substantially straight along its length. Typically, the connecting bar 32 is oriented in a substantially horizontal position, and is substantially parallel with the connecting tube 28 of the stationary main frame 20. When the connecting bar 32 is oriented in such fashion, the arm bars 30a,b extend away from opposing ends of the connecting bar 32 so that each arm bar 30a,b can pivotably connect with an open end of a corresponding arm tube 26a,b. The arm bars 30a,b can then be connected to the stationary main frame 20. Holes machined through the open ends of the arm bars 30a,b and through the open ends of the corresponding arm tubes 26a,b are sized for connecting bolts or hardware to pivotably connect the arm bars 30a,b to a corresponding arm tube 26a,b. When the arm bars 30a,b are secured to the arm tubes 26a,b, the movable frame 22 can pivot with respect to the stationary main frame 20.

The cover 24 can be made of collapsible or flexible material such as plastic, vinyl, canvas, or other similar types of material. The cover 24 includes a cover retainer bar 34 along one edge of the cover 24 that can be used to support the cover 24 in a position relative to the stationary main frame 20. For example, the cover 24 can be stretched between the connecting tube 28 and the movable frame 22 so that at least one portion of the cover 24 remains stationary with respect to the stationary main frame 20, and another portion of the cover 24 can pivot or move concurrently with the movable frame 22 when the movable frame 22 pivots with respect to the stationary main frame 20.

Typically, the cover 24 is made from canvas panels and has a clear plastic window in one or more of the canvas panels. For example, the cover 24 can be a four-panel, box-shaped cover with a clear plastic window in the rear panel. The box-shaped cover includes a cover retainer bar 34, a top panel 36 connected to a rear panel 38, and a left side panel 40 and right side panel 42, both connected to the top panel 36 and rear panel 38. The side 44 of the top panel 36 that is not connected to an adjacent panel 38, 40, 42 incorporates a cover retainer bar 34 that can connected to or stitched within the unconnected side 44 of the top panel 36. A cover retainer bar 34 can be a round plastic cord that is approximately ⅜" diameter. The box-shaped cover is fit over the movable frame 22, with the cover retainer bar 34 of the top panel 36 operable to connect to the stationary main frame 20. Since the box-shaped cover is manufactured from a fabric-type material, the cover 24 remains flexible when the movable frame 22 pivots with respect with the stationary main frame 20.

The invention 10 can also include a cover retainer strip 46 connected to the stationary main frame 20. Typically, the cover retainer strip 46 is a piece of flat corner bar with a recess 48 machined into the length of the bar. The cover retainer strip 46 is substantially straight along its length. The recess 48 which is typically a "C-shaped" channel is sized to receive the corresponding cover retainer bar 34 along the unconnected side 44 of the top panel 36 of the cover 24.

When the cover retainer strip 46 is positioned substantially horizontal and parallel with the connecting tube 28 of the stationary main frame 20, the cover retainer strip 46 can be connected to the connecting tube 28. Conventional bolts or other connectors can be used to connect the strip 46 to the connecting tube 28. When the cover retainer strip 46 is secured to the connecting tube 28, the recess 48 is oriented towards the movable frame 22 and the cover 24. The cover retainer strip 46 and cover retainer bar 34 cooperate to support the cover 24 from the recess 48. When the cover retainer bar 34 is inserted into and along the length of the recess 48, the cover retainer bar 34 and adjacent cover 24 are held securely against the cover retainer strip 46. Other configurations of the cover retainer strip 46, the cover retainer bar 34, and the recess 48 exist to connect the cover 24 to the cover retainer strip 46.

Note that the cover 24 can also include Velcro™ (hook and loop) straps (not shown) or other similar types of straps or tie downs to further secure the cover 24 to the cover retainer strip 46 in a non-operation upright position, the stationary main frame 20, or to the top portion of the rear support frame 12. Velcro™ (hook and loop) straps can be connected to the top panel of the cover 24, and can be wrapped around the cover retainer strip 46, the stationary main frame 20, or the top portion of the rear support frame 12 to support the cover 24 in a position relative to the stationary main frame 20.

Initially, when the invention 10 is not in use, the movable frame 22 can be pivoted upward so that the connecting bar 32 of the movable frame 22 is adjacent to the connecting tube 28 of the stationary main frame 20. Thus, when the invention 10 is not in use, the cover 24 is not deployed over the rear compartment of the golf cart, and when positioned in the non-operative upright position, allows a user such as a golfer to access the rear bag compartment of the golf cart.

When the movable frame 22 is pivoted downward from the upper portion of the rear support frame 12 of the golf cart, the cover 24 cooperates with the movable frame 22 and extends downward and over the rear compartment of the golf cart. Typically, the shape or design of the cover 24 limits the downward movement of the movable frame 22 to the intersection between the top panel 36 and the rear panel 38 of the cover 24. Thus, when deployed, the cover 24 provides protection from the weather and elements for objects such as golf clubs and golf bags stored in the rear compartment of the golf cart. A user such as a person sitting in the front portion of the golf cart can still access the rear compartment of the golf cart even when the framed rear bag cover 10 is in a deployed position.

Figure 3:
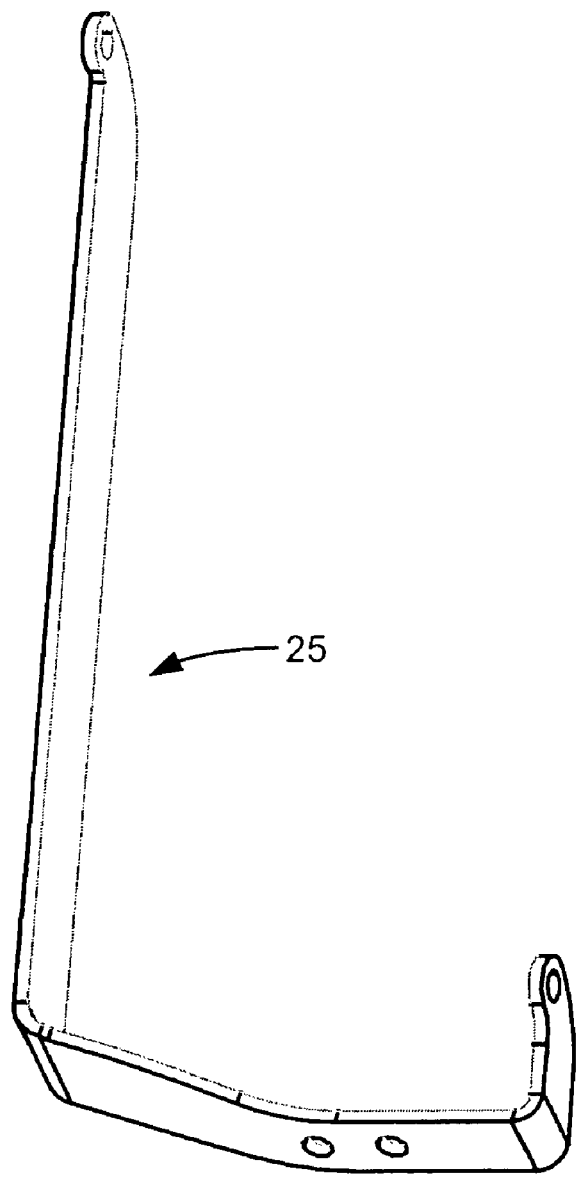
FIG. 3 is a perspective view showing a bracket.

FIG. 3 illustrates a perspective view of a bracket. One end of the bracket 25 is shaped so that it wraps a round the upper portion of the rear support frame 12. When secured to the golf cart, one end of the bracket 25 is secured to the upper portion of the rear support frame 12. The bracket 25 extends out towards the rear of the motorized golf cart and then bends towards the exterior of the golf cart to a point at which it has extended past the rear support frame 12. The bracket 5 then extends towards the exterior of the golf cart. This section of the bracket contains the holes for the mounting to the stationary main frame 20. At a point at which this portion of the bracket 25 is longer than the width of the rear support frame 12, the bracket 25 bends again and extends towards the front of the golf cart. The bracket 25 extends until it reaches the point at the roof 5 near the hand support grip handles 15. This end of the bracket 25 contains a hole to allow the bracket 25 to be secured to the roof 5 near the hand support grip handles 15.

Figure 4:
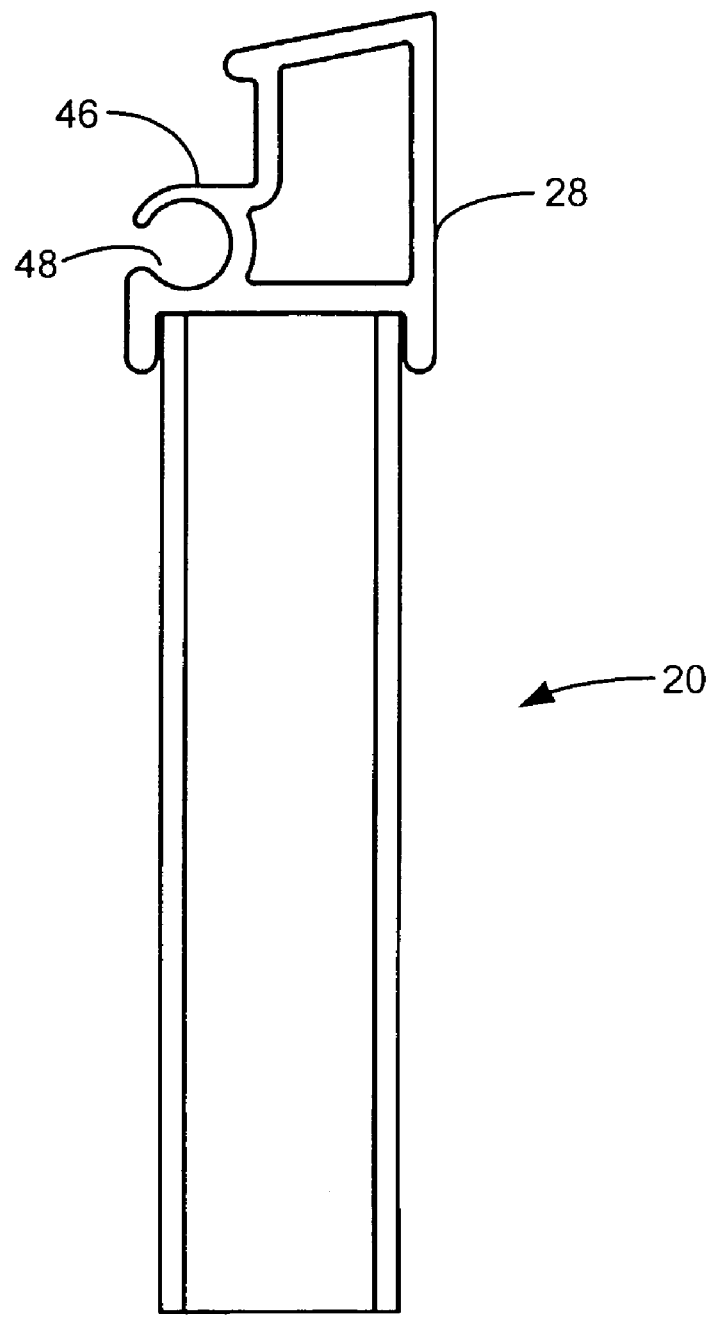
FIG. 4 is a side view of the stationary main frame member.
Figure 5:
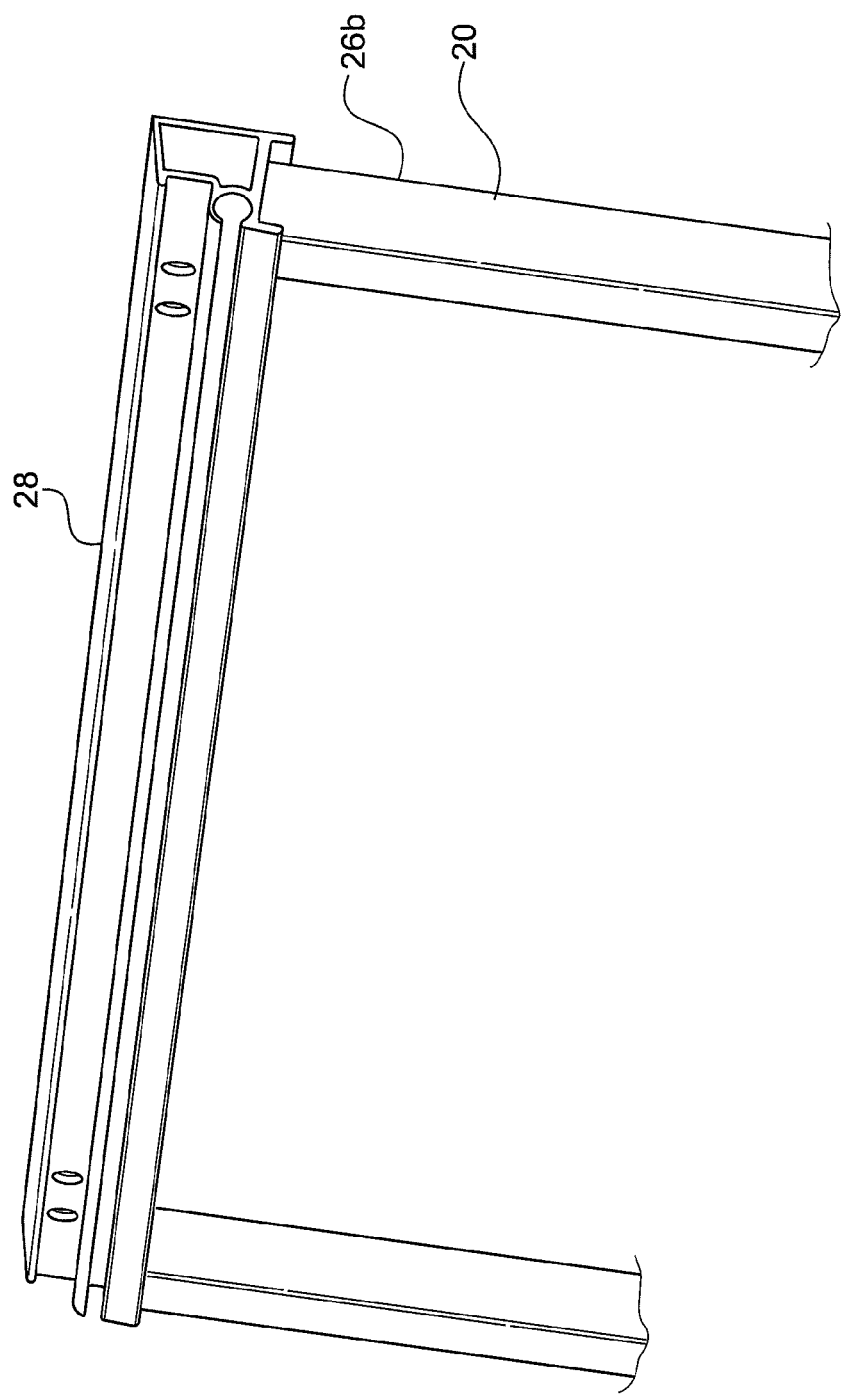
FIG. 5 is a perspective view showing the stationary main frame member.

FIG. 4 illustrates a side view of a stationary main frame. From this view, the recess 48 which is machined into the cover retainer strip 46 can more easily be seen. FIG. 5 illustrates a perspective view of a stationary main frame 20. The stationary main frame 20 has machine drilled holes for mounting the stationary main frame 20 to the brackets 25.

Alternative embodiments will become apparent to those skilled in the art to which the invention pertains without departing from its spirit and scope.

The invention claimed is:

1. An apparatus for mounting to a golf cart comprising a front portion, a rear compartment, a support frame and a roof, the apparatus comprising:
   a plurality of brackets, wherein each bracket comprises at least two legs and wherein one leg is longer than an other leg and wherein the brackets are configured to be attached to the support frame and the roof, wherein each bracket is configured to be secured to the support frame, extend towards the front of the golf cart, and be secured to the roof of the golf cart;
   a stationary main frame connected to the brackets, the stationary main frame comprising:
      a U-shape frame with
         a pair of arm tubes, and
         a connecting tube between the arm tubes, wherein the connecting tube is configured to mount to the rear support frame of the golf cart;
   at least one movable frame connected to the stationary main frame, the at least one movable frame comprising:
      a U-shape piece with
         two arm bars, wherein at least one arm bar connects to the stationary main frame; and
         a connecting bar between the two arm bars, wherein the movable frame can rotate over a portion of the rear compartment of the golf cart;
   a cover retainer strip connected to the stationary main frame, comprising:
      an elongate strip; and
      a channel recess extending along a portion of the elongate strip; and
   a cover connected to the cover retainer strip, wherein the cover extends from the channel recess and over the movable frame when the movable frame is rotated over a portion of the rear compartment of the golf cart.

2. The apparatus of claim 1, further comprising:

a cover retainer bar configured to slide within the channel recess to support a portion of the cover within the channel recess.

3. The apparatus of claim 1, wherein the roof comprises a section with handles, wherein the brackets connect to the golf cart at an upper portion of a rear support frame and at the roof at the portion near the handles.

* * * * *